United States Patent Office 2,733,275
Patented Jan. 31, 1956

2,733,275
PREPARATION OF 2,4,6-TRINITROCHLOROBENZENE

Leonardus J. Revallier, Geleen, Netherlands, assignor to Stamicarbon N. V., Heerlen, Netherlands No Drawing. Application June 8, 1953,
Serial No. 360,389

Claims priority, application Netherlands June 13, 1952

3 Claims. (Cl. 260—646)

The present invention concerns the preparation of 2,4,6,-trinitrochlorobenzene.

2,4,6,-trinitrochlorobenzene is an interesting product because of its possible usefulness as an intermediate in various organic syntheses owing to the high mobility of the Cl-atom. By starting from 2,4,6,-trinitrochlorobenzene it is possible to manufacture for example 1,3,5,-trinitrobenzene, 1,3,5,-trihydroxybenzene and/or picric acid in a simple manner.

Hitherto this development has not materialized, because the technical manufacture of 2,4,6,-trinitrochlorobenzene itself from 2,4,-dinitrochlorobenzene, which is very easy to prepare from chlorobenzene was not a commercial proposition owing the large excess of nitric acid needed for introducing the third nitro group, while furthermore the yield obtained was relatively low if calculated with respect to the amount of dinitrochlorobenzene used as a starting material.

Table I provides a survey of reaction conditions under which 4 nitrating treatments for converting dinitrochlorobenzene into trinitrochlorobenzene were carried out, this table also shows the results obtained in said treatments as far as the yield and the melting point of the final product are concerned. The data (complied in the table) have been taken from a survey by L. Desvergnes, Chim. et Ind. 25, 3–16, 291–306 (1931) in which several nitrating treatments for converting dinitrochlorobenzene into trinitrochlorobenzene are discussed in full detail.

From these data it appears that reaction periods of 15 hrs. and a four to eight-fold excess of nitric acid are considered essential for introducing the third nitro group.

It has now been found, that 2,4-dinitrochlorobenzene can be converted into 2,4,6-trinitrochlorobenzene in a much shorter reaction time and by means of a much smaller excess of nitrating agent calculated on the amount of nitric acid. Accordingly, the provision of a process for preparing 2,4,6-trinitrochlorobenzene with the above mentioned advantages is the principal object of the invention although other objects including novel improvements in the production of 2,4,6-trinitrochlorobenzene are also contemplated.

Broadly stated, the production of 2,4,6-trinitrochlorobenzene by nitrating 2,4-dinitrochlorobenzene is carried out, according to the present invention by using nitronium hydrogenpyrosulfate ($NO_2^+$) ($HS_2O_7^-$), as nitrating agent.

Compared with the nitrating processes hitherto known the nitration of dinitrochlorobenzene to trinitrochlorobenzene could be carried out at a somewhat higher temperature and consequently much faster; furthermore it has been found that by the process according to the invention it is possible to save a considerable amount of nitration agent calculated on the basis of the nitric acid content of the nitronium hydrogenpyrosulfate while moveover a higher yield of pure trinitrochlorobenzene can be obtained.

The nitration agent applied, namely nitronium hydrogenpyrosulfate, is a so-called solid nitrating acid which may also be represented by the formulae $2SO_3 \cdot HNO_3$ or $4SO_3 \cdot N_2O_5 \cdot H_2O$; it has a melting point of 105° C. and can be conveniently prepared by the process described in my co-pending application Serial No. 350,189, filed April 21, 1953.

When carrying out the nitration process according to the invention it is possible either to add the nitrating agent portion-wise to the substance to be nitrated or to proceed in the reverse manner.

Since the heat of fusion of the solid nitrating acid is much greater than that of solid dinitrochlorobenzene, the former method offers the advantage that while the solid compound is being added more heat is withdrawn from the reaction mixture for melting said solid compound than is the case in the latter method. In consequence it is possible to control the temperature of the reaction mixture in a simple manner.

After completion of the reaction, the acid phase can be separated in the known manner from the organic phase, which has the smaller specific gravity. By diluting the waste acid with a suitable amount of water it is possible to precipitate some more nitroproduct.

After washing the crude product with water and subsequently recrystallizing it in carbon tetrachloride to

Table I

| Nitration | Reaction time in hrs. | Reaction temp., °C. | Additions to 100 g. dinitrochlorobenzene in g. | | | Melting point of crude final product | Yield[1] in percent |
| --- | --- | --- | --- | --- | --- | --- | --- |
| | | | $HNO_3$, 91.5% | Oleum, 40% | $H_2SO_4$, 100% | | |
| I | first 3 <br> then 12 | 70–130 <br> 130 | 300 | 200 | 200 | 70.2 | 55 |
| II | first 3 <br> then 12 | 70–130 <br> 130 | 125 | | 750 | 78.6 | 68 |
| III | first 3 <br> then 12 | 70–130 <br> 130 | 132 | 200 | 570 | 79.4 | 66 |
| IV | first 3 <br> then 12 | 70–130 <br> 150 | 132 | 200 | 570 | 78.8 | 65.5 |
| Theoretically needed | | | 34 | | | | |

[1] Calculated on the basis of purified final product.

which 4% by volume of chloroform has been added, a purified product with a melting point of 81–82° C. is obtained.

Table II gives a survey of the reaction conditions under which various nitrating treatments for converting dinitrochlorobenzene into trinitrochlorobenzene with the help of nitronium hydrogenpyrosulfate took place. The nitronium hydrogenpyrosulfate contained:

70.3% $SO_3$
28.7% $HNO_3$
0.6% $H_2O$
0.4% $N_2O_3$

It will be clear that the invention is not restricted to the use of a nitrating agent of the abovementioned composition but that it is also possible to use nitrating agents mainly consisting of nitronium hydrogenpyrosulfate and containing e. g. at least 95% of said substance.

Table II

| Nitration | Reaction time in hrs. | Reaction temp., °C. | Grams of nitronium hydrogen pyrosulfate added to 100 g. of dinitrochlorobenzene | Melting point of crude final product | Yield [1] |
|---|---|---|---|---|---|
| I | first 1½, then 2½ | 140–160, 160–170 | 250 | 75 | 81 |
| II | 1½ | 140–160 | 250 | 72 | 74 |
| III | 1½ | 150–160 | 250 | 68 | 70 |
| IV | 1½ | 140–160 | 215 | 57 | 60 |
| V | first 1½, then ½ | 140–160, 160–170 | 125 | 45 | 49 |
| Theoretically needed. | | | [2] 110 | | |

[1] Calculated on the basis of the purified final product.
[2] Calculated on the basis of the HNO₃-content of the nitronium hydrogenpyrosulfate.

From these tests it will be seen that with an excess of nitrating agent of only 100–130% calculated on the $HNO_3$-content of the nitronium hydrogenpyrosulfate a very reasonable yield of pure 2,4,6-trinitrochlorobenzene can be obtained; the process according to the invention consequently results in a great saving of nitric acid as compared with the methods known hitherto in which an excess of at least 300% was used.

At the same time a considerable saving of $SO_3$ or $H_2SO_4$ is effected while moreover the reaction time is considerably reduced.

The invention has made it possible therefore to prepare trinitrochlorobenzene in a technically economical manner, for which substance there are important applications in the organochemical industry.

I claim:

1. A process for producing 2,4,6-trinitrochlorobenzene which comprises reacting, at a temperature of between 140 and 170° C., 2,4-dinitrochlorobenzene with an excess of a nitrating agent consisting essentially of nitronium hydrogenpyrosulfate and recovering the trinitrochlorobenzene from the resulting reaction mixture, the nitrating agent being used in an amount constituting 100–130% excess on the basis of the $HNO_3$ content of the nitrating agent.

2. A process for producing 2,4,6-trinitrochlorobenzene which comprises reacting, at a temperature of between 140 and 170° C., 2,4-dinitrochlorobenzene with an excess of a nitrating agent consisting essentially of nitronium hydrogenpyrosulfate, the nitrating agent being used in an amount constituting 100–130% excess on the basis of the $HNO_3$ content of the nitrating agent, permitting the reaction mixture to settle into two layers, drawing off the underlayer comprising spent nitrating agent, and separating out the desired trinitrochlorobenzene by crystallization from said other layer.

3. The process of claim 2 wherein the crystallized trinitrochlorobenzene is purified by washing with water and recrystallizing the same.

References Cited in the file of this patent

UNITED STATES PATENTS 2,297,733   Wyler et al. _____ Oct. 6, 1942

OTHER REFERENCES

Goddard et al.: J. Chem. Soc., 1950, pages 2564–2566.
Glazer et al.: J. Chem. Soc., 1950, pages 2663–76.